(12) United States Patent
Becker

(10) Patent No.: US 7,750,489 B2
(45) Date of Patent: Jul. 6, 2010

(54) POWER CONTROL SYSTEM AND METHOD

(75) Inventor: James Becker, Crystal Lake, IL (US)

(73) Assignee: C. E. Niehoff & Co., Evanston, IL (US)

( * ) Notice: Subject to any disclaimer, the term of this patent is extended or adjusted under 35 U.S.C. 154(b) by 0 days.

(21) Appl. No.: 12/386,374

(22) Filed: Apr. 17, 2009

(65) Prior Publication Data

US 2009/0234509 A1    Sep. 17, 2009

Related U.S. Application Data

(62) Division of application No. 11/397,523, filed on Apr. 3, 2006, now Pat. No. 7,635,922.

(51) Int. Cl.
F02D 29/06 (2006.01)
H02P 9/04 (2006.01)

(52) U.S. Cl. .......................... 290/40 C; 322/8

(58) Field of Classification Search ............... 290/40 C, 290/40 B, 40 R; 322/8, 29, 44, 59
See application file for complete search history.

(56) References Cited

U.S. PATENT DOCUMENTS

| | | | |
|---|---|---|---|
| 3,789,229 A | 1/1974 | Jackson | |
| 4,510,903 A | 4/1985 | Sakakiyama | |
| 4,629,968 A | 12/1986 | Butts et al. | |
| 4,857,755 A * | 8/1989 | Comstock | 307/47 |
| 4,998,520 A | 3/1991 | Wright | |
| 5,402,007 A | 3/1995 | Center et al. | |
| 5,414,792 A | 5/1995 | Shorey | |
| 5,481,176 A | 1/1996 | DeBiasi et al. | |
| 5,570,001 A | 10/1996 | Fenley | |
| 5,986,439 A | 11/1999 | Pletta et al. | |
| 6,247,446 B1 | 6/2001 | Fassler et al. | |
| 6,404,007 B1 | 6/2002 | Mo et al. | |
| 6,488,005 B2 | 12/2002 | Kim | |
| 6,801,020 B2 | 10/2004 | Blackburn | |
| 6,836,718 B2 | 12/2004 | Hasfjord et al. | |
| 7,512,461 B2 * | 3/2009 | Schubert | 701/1 |
| 2003/0155202 A1 * | 8/2003 | Taniguchi | 192/45 |
| 2007/0158947 A1 * | 7/2007 | Annen et al. | 290/1 R |

* cited by examiner

*Primary Examiner*—Julio Gonzalez
(74) *Attorney, Agent, or Firm*—Law Offices of Michael M. Ahmadshahi

(57) ABSTRACT

This invention discloses a power control system comprising a prime mover and a generator driven by the prime mover. A control device is coupled with the generator to ascertain a change in speed of the generator and vary an output power of the generator according to the change. The control device applies a signal to reduce the generator output power and another signal to restore the generator output power. The power control system may include a transmission, a speed converter, and/or an accessory.

46 Claims, 9 Drawing Sheets

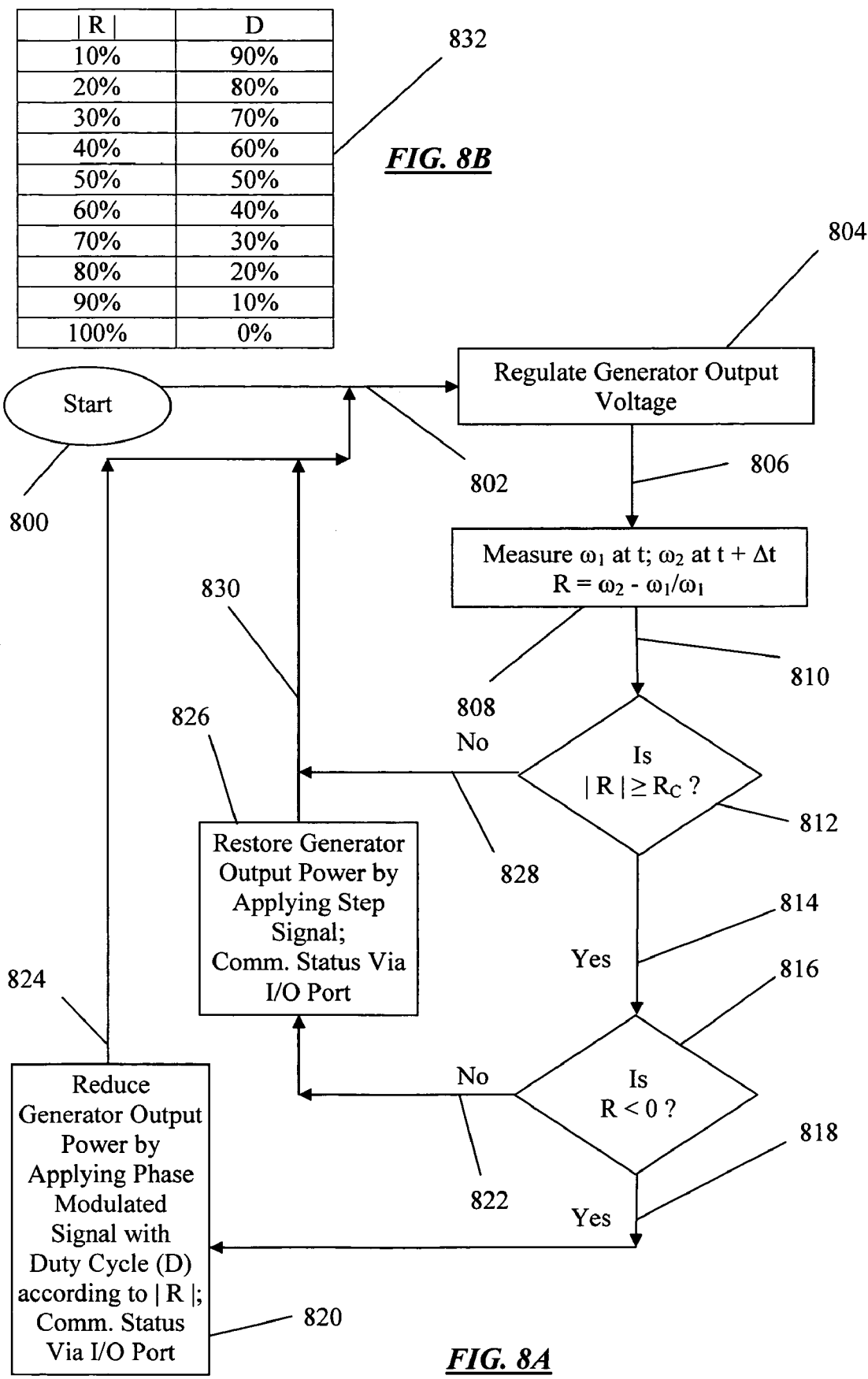

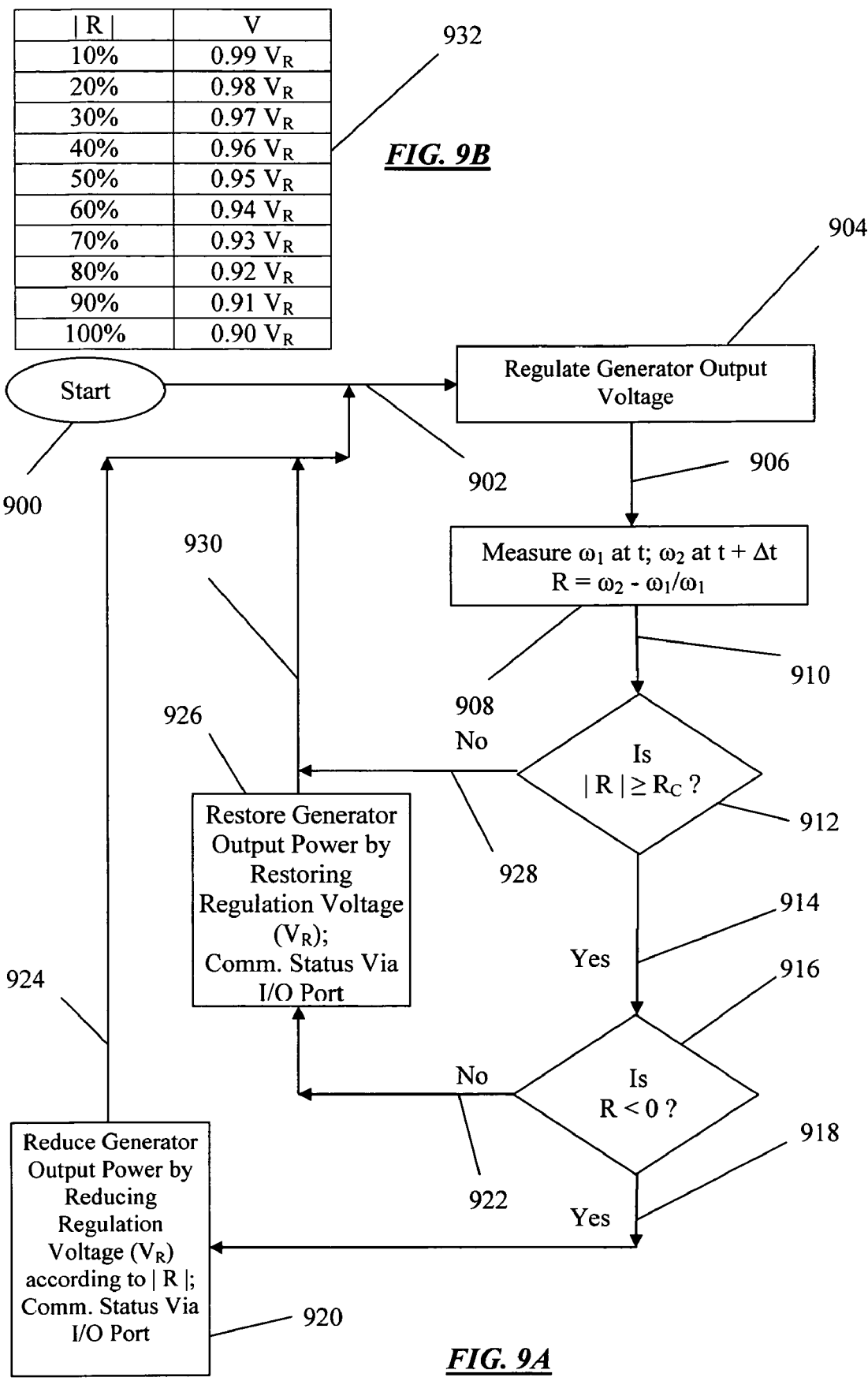

POWER CONTROL SYSTEM AND METHOD

CROSS REFERENCE TO RELATED APPLICATIONS

The present patent application is a division of a non-provisional patent application entitled "POWER CONTROL SYSTEM AND METHOD," filed Apr. 3, 2006, now U.S. Pat. No. 7,635,922, as U.S. patent application Ser. No. 11/397,523 by the same inventors. This patent application claims the benefit of the filing date of the cited non-provisional patent application according to the statutes and rules governing non-provisional patent applications, particularly 35 USC §§120, 121, and 37 CFR §1.78. The specification and drawings of the cited non-provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to power control systems comprising a prime mover, such as an internal combustion engine, and a generator driven by the prime mover. In particular, this invention relates to a control device, including a system and method, which controls the output power of the generator according to a change in speed of the generator or the prime mover by measuring a speed of a generator or prime mover speed indicator and varying the output power of the generator according to said change.

BACKGROUND

The present invention relates to power control systems which comprise a prime mover and a generator driven by the prime mover. Such a power system may be implemented in a vehicle, where an internal combustion engine provides mechanical power to propel the vehicle, and to drive engine accessories, such as generators, air conditioning units, compressors, cooling fans, and pumps, to name a few examples. In a generator set, an internal combustion engine drives a generator to convert the engine's mechanical power into electrical power. The present invention specifically focuses on a control device that controls the generator output power in order to avoid excessive load on the engine and the drive components. In particular, the control device is configured to ascertain a change in speed of the generator or the engine and to control the generator output power controller to avoid stalling the engine.

Electro-mechanical power conversion systems, such as those mentioned above, are normally comprised of an internal combustion engine and a generator. The engine supplies the generator with mechanical power where it is converted to electrical power. In a vehicle, for instance, the generator generates electrical power for the vehicle electrical system when the vehicle's engine is operating. In a generator set, the engine's mechanical power is converted to electrical power by the generator which is available via power output connectors. As electrical loads are added and removed from the generator, the engine experiences the corresponding variation in mechanical loads. In the case of the vehicle, during idle periods, such variations in mechanical loads on the engine cause the engine's rotational speed, commonly referred to as the RPM (revolution per minute) to vary accordingly. In the case of the generator set, similar changes in the RPM occur as electrical loads are connected and disconnected with the power output connectors.

The engine drives the generator, via a coupling, at a substantially equivalent speed. A typical coupling between an engine and a generator comprises a pair of pulleys and one or more belts that are used to impart the engine's speed onto the generator. Another type of coupling involves splined shafts where specially machined shafts of the engine and generator are mated together so that the engine's shaft directly drives the generator's shaft.

Engine stall is a common problem in electro-mechanical power conversion systems, such as those mentioned above. Engine stalls when there is excessive mechanical power demand on the engine. This demand can be due to electrical loads on the generator or any other mechanical power consuming device driven by the engine. A typical internal combustion engine power output is a function of the engine RPM. At steady state conditions, the engine can deliver a certain torque at the operating RPM. As the torque requirement exceeds this torque the engine RPM begins to decrease which may eventually cause the engine to stall. In addition, a rapid change in the power transfer, can damage the drive mechanism.

Furthermore, sudden power demand from the engine can be hindered by the existing mechanical loads on the engine. Such mechanical loads can be due to a generator and/or an accessory, such as an electrical motor. The mechanical load on the engine, due to the generator, can be excessive. Removal or attenuation of such load from the engine can supply the engine with the power it needs to meet the sudden power demand.

Although various systems have been proposed which touch upon some aspects of the above problems, they do not provide solutions to the existing limitations in power control systems. For example, in Blackburn, U.S. Pat. No. 6,801,020, the invention is directed to a method of limiting a rate of change of the output current supplied by a starter/alternator in the generator mode, thereby limiting the possibility that the rapidly increasing electrical load could either stall or cause another operational fault in the associated internal combustion engine. The present invention focuses on a change in the speed of the generator and controls its output according to the change. Accordingly, any change in speed, regardless of the source that caused such change, will be monitored and acted upon.

In Fenley, U.S. Pat. No. 5,570,001, the invention discloses an apparatus that includes an engine driving an alternator where the engine speed is automatically controlled by manipulating the throttle according to the charging current of the alternator. The apparatus is further capable of unloading the alternator from the engine when excessive electrical loads are engaged, in order to prevent the engine from stalling. However, since this apparatus operates on detecting the alternator current, it is prone to electrical noise. The system described herein monitors a change in speed which is a mechanical action rather than monitoring an electrical variable. Furthermore, electric current at a fixed voltage is related to electric power which in turn is related to the mechanical power produced by the engine. That is why Fenley teaches unloading the alternator at an excessive current. But the engine mechanical power varies also with combustion air density, fuel energy content, ambient temperature, wear condition of the engine, other parasitic loads driven by the engine, and various other conditions that Fenley needs to consider in calibrating engine overload power. The system described herein does not need to consider such influences to the available engine power because a sudden reduction of engine speed is presumed to be an overload on the engine power, no matter the source of that overload.

In DeBiasi et al., U.S. Pat. No. 5,481,176, the disclosure describes a charging system including an engine driving an alternator and a voltage regulator, where the voltage regulator voltage set-point is modified by an engine controller device according to (1) near-wide-open-throttle, (2) application of vehicle brakes, and (3) increased torque of the alternator, or any combination thereof. When condition (3) is met, the engine controller manipulates the engine idle speed to keep it relatively constant as the applied electrical loads cause the alternator's torque on the engine to increase. However, this charging system monitors an increase in alternator torque on the engine, whereas the present invention monitors a change in the rotational speed of the alternator. Additionally, the DeBiasi system responds to an increase in torque of the alternator on the engine, whereas the present invention responds to a change in torque on the engine regardless of the source, even torque changes from an accessory other than the alternator that is driven by the engine.

In a copending commonly assigned U.S. patent application Ser. No. 11/234,579, filed Sep. 23, 2005 and entitled "Power Control System and Method," hereby incorporated by reference in its entirety, a power control system was disclosed where a control device ascertained a power level of the generator and varied an output power of the prime mover according to the power level. More specifically, the prime mover output power was manipulated so that the generator power level could be maintained within a specified range. The present invention complements this system by providing an additional protection to the engine from stalling during those periods when the change in engine rotational speed is so high that a faster response than manipulating the engine's output power is required.

Power conversion systems, such as those incorporated in a vehicle or a generator set, utilize a prime mover and a generator. The output power of the prime mover may be adjusted in accordance with the power level of the generator. Additional protection can be afforded such systems by monitoring the change in the rotational speed of the generator or the prime mover and manipulating the output power of the generator to avoid excessive loads on the engine. Where a situation arises that the prime mover output power adjustment does not adequately address the excessive load problem of such prime movers, the present invention provides an additional protection by adjusting the output power of the generator.

SUMMARY

The present invention discloses a control device, including a system and method, which can be utilized in a power conversion system to ensure efficient power conversion and improved operation. The power conversion system includes a prime mover, such as an internal combustion engine, and a generator, such as an alternator, that is driven by the prime mover. The control device is coupled with the generator, and it ascertains a change in speed of the generator and varies an output power of the generator according to the change. Preferably, the control device is coupled with the generator via a generator output power controller, capable of manipulating an output power of the generator. The control device is configured to measure a change in speed of the generator, via a generator speed indicator and to apply a control signal to the generator output power controller according to the change. The control device may be further configured to regulate an output voltage of the generator via the generator output power controller. The power control system may include a transmission, a speed converter, and/or an accessory. The control device may be further configured to communicate system information to a computer system.

In one aspect, a power control system is disclosed comprising a prime mover, a generator, and a control device connected to and in communication with the generator. The control device is configured to ascertain a change in speed of the generator and to vary an output power of the generator according to said change. Preferably, the generator comprises a generator output power controller and a speed indicator coupled with the control device and wherein the control device ascertains a change in speed of the generator via said speed indicator and varies an output power of the generator by applying a control signal to the generator output power controller according to the change. Preferably, the control device either reduces or restores the generator output power when the change is above a threshold value. In one instance, the control device reduces the generator output power when the speed is decreasing, i.e., the algebraic sign of the change is negative and restores the generator output power when the speed is increasing, i.e., the algebraic sign of the change is positive.

In another aspect, a power control system is disclosed comprising a prime mover, a generator, and a control device connected to and in communication with the generator. The control device is configured to ascertain a change in speed of the generator and to vary an output power of the generator according to said change. Preferably, the control device further comprises a voltage regulator capable of regulating the output voltage of the generator at a regulation voltage. Preferably, the control device varies the regulation voltage according to the change, hence, it either reduces or restores the regulation voltage when the change is above a threshold value. In one instance, the control device reduces the regulation voltage when the speed is decreasing, i.e., the algebraic sign of the change is negative and restores the regulation voltage when the speed is increasing, i.e., the algebraic sign of the change is positive.

In another aspect, a power control system is disclosed comprising a prime mover, a generator, and a control device connected to and in communication with the generator. The control device is configured to ascertain a change in speed of the generator and to vary an output power of the generator according to said change. Preferably, the power control system further includes communication means in order to provide system information. Preferably, the control device comprises visual indicators, such as light emitting diodes (LEDs) which generate flashing light patterns indicative of said system information. The control device may further incorporate a communication port where the system information is communicated to a computer system.

In another aspect, a power control system is disclosed comprising a prime mover, a generator, and a control device connected to and in communication with the generator. The control device is configured to ascertain a change in speed of the generator and to vary an output power of the generator according to said change. Preferably, the control device comprises a processor coupled with the generator output power controller and speed indicator wherein the processor measures a change in speed of the generator, via a first line, and varies the output power of the generator by applying a speed-control signal to the generator output power controller, via a second line, according to the change. In one instance, the generator speed indicator is a phase winding of the generator, wherein the processor ascertains a change in generator RPM, via the first line, and the generator output power controller is a generator field coil, wherein the processor applies a speed-control signal to vary the generator output power, via the second line. Preferably, the processor is configured to apply either a phase modulated signal or a step signal when the change is above a threshold value. In one instance, the processor is configured to apply a phase modulated signal when the speed is decreasing, i.e., the algebraic sign of the change is negative and to apply a step signal when the speed is increasing, i.e., the algebraic sign of the change is positive.

In another aspect, a power control system is disclosed comprising a prime mover, a generator, and a control device connected to and in communication with the generator. The control device is configured to ascertain a change in speed of the generator and to vary an output power of the generator according to said change. Preferably, the control device comprises a processor coupled with the generator output power controller and speed indicator wherein the processor measures a change in speed of the generator, via a first line, and varies the output power of the generator by applying a speed-control signal to the generator output power controller, via a second line, according to the change. Preferably the processor is further coupled with an output terminal of the generator and configured to measure an output voltage of the generator, via a third line, and to apply a voltage-control signal to the generator output power controller, via a fourth line, so that the output voltage is maintained at a regulation voltage. In one instance, the processor is configured to apply only a voltage-control signal to the generator output power controller, via the second line, wherein the regulation voltage is varied according to the change, thus eliminating the need for the fourth line. Preferably, the processor varies the regulation voltage according to the change, hence, it either reduces or restores the regulation voltage when the change is above a threshold value. In one instance, the processor reduces the regulation voltage when the speed is decreasing, i.e., the algebraic sign of the change is negative and restores the regulation voltage when the speed is increasing, i.e., the algebraic sign of the change is positive.

In one aspect, a method is disclosed for controlling a power control system comprising a prime mover and a generator driven by the prime mover. The method comprises ascertaining a change in speed of the generator, via a generator speed indicator, and varying an output power of the generator, via a generator output power controller, according to said change. Preferably, the method comprises either reducing or restoring the generator output power when the change is above a threshold value. In one instance, the method comprises reducing the generator output power when the speed is decreasing, i.e., the algebraic sign of the change is negative and restoring the generator output power when the speed is increasing, i.e., the algebraic sign of the change is positive.

In one aspect, a method is disclosed for controlling a power control system comprising a prime mover and a generator driven by the prime mover. The method comprises ascertaining a change in speed of the generator, via a generator speed indicator, and varying an output power of the generator, via a generator output power controller, according to said change. Preferably, the method further comprises maintaining an output voltage of the generator, via a voltage regulator, at a regulation voltage. Preferably, the method comprises varying the regulation voltage according to the change, hence, either reducing or restoring the regulation voltage when the change is above a threshold value. In one instance, the method comprises reducing the regulation voltage when the speed is decreasing, i.e., the algebraic sign of the change is negative and restoring the regulation voltage when the speed is increasing, i.e., the algebraic sign of the change is positive.

BRIEF DESCRIPTION OF THE DRAWINGS

FIG. 8A is a flow diagram of one preferred method of operation of the power control system of FIG. 1, FIG. 2, or FIG. 3, further operating as a voltage regulator.

FIG. 8B is a diagram of one preferred method of applying a phase modulated signal corresponding to FIG. 8A.

FIG. 9A is a flow diagram of one preferred method of operation of the power control system of FIG. 1, FIG. 2, or FIG. 3, further operating as a voltage regulator.

FIG. 9B is a diagram of one preferred method of varying a regulation voltage corresponding to FIG. 9A.

DETAILED DESCRIPTION OF THE PRESENTLY PREFERRED EMBODIMENTS

Figure 1:
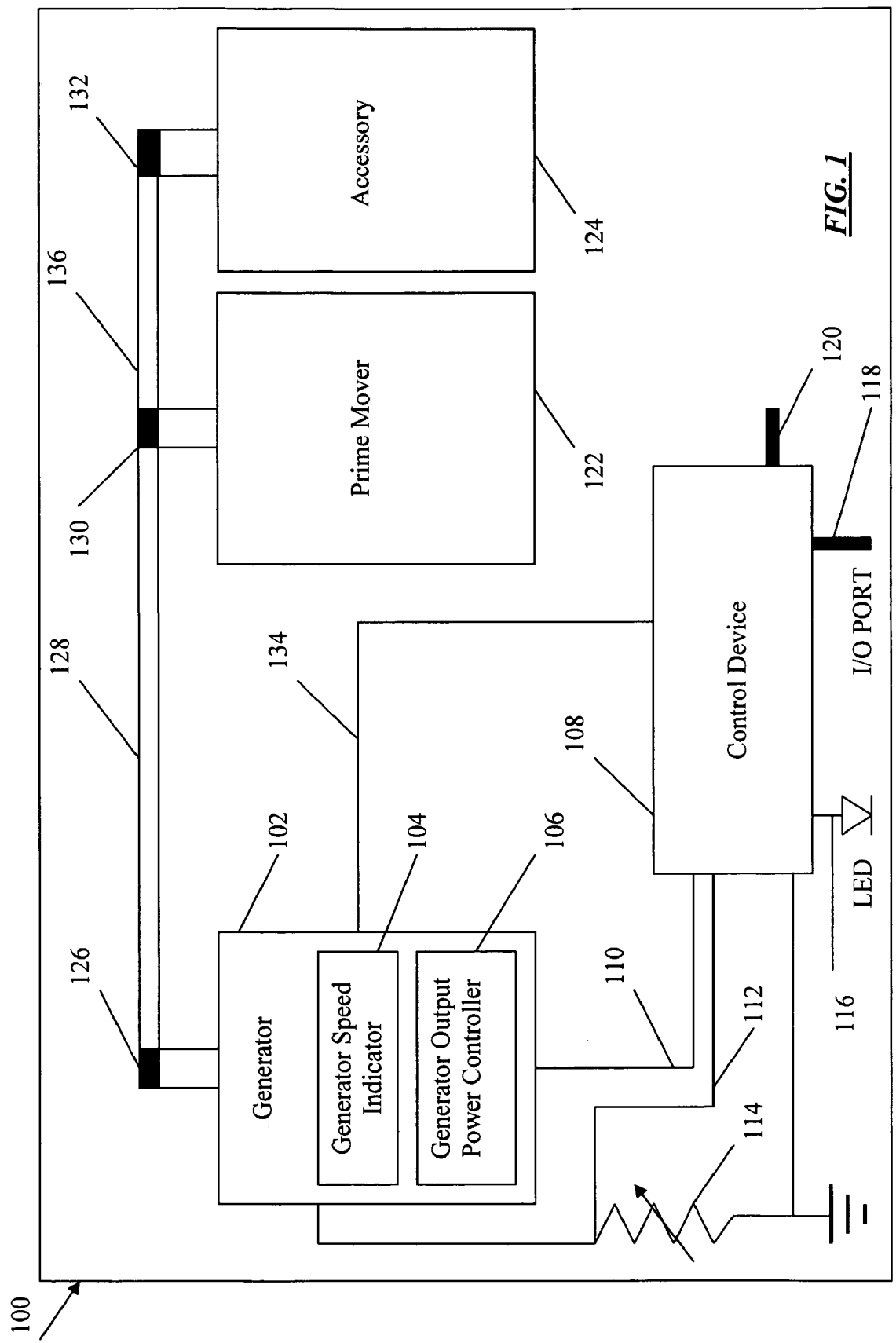
FIG. 1 shows a block diagram of a power control system according to a preferred embodiment.

FIG. 1 depicts a block diagram of a preferred embodiment of a power control system 100, including a generator 102, a prime mover 122, an accessory 124, and a control device 108. The control device 108 is connected to and in communication with the generator 102 via a generator speed indicator 104 and a generator output power controller 106. The control device 108 ascertains a change in speed of the generator by measuring a change between two consecutive speeds of the generator speed indicator 104 via a line 134. The control device 108 varies an output power of the generator 102 by applying a signal to the generator output power controller 106 via a line 110. It should be clear to a skilled artisan that the term signal, as used throughout this specification including the drawings, refers to both analog and digital signal whether transmitted through wire or wireless. The control device 108 is powered by the output of the generator 102 via a line 112. The generator 102 is coupled with and driven by the prime mover 122 via a coupling mechanism 128 that imparts a rotational speed of a shaft 130 of the prime mover 122 on a shaft 126 of the generator 102. The generator 102 converts mechanical power of the prime mover 122 into electrical power which is available to a variable electrical load 114. The variable electrical load 114 represents electrical loads by electrical components which may comprise a battery, a heating element, an air conditioning unit, a compressor, a cooling fan, or a pump, to name a few examples. As these electrical loads are applied and removed from the generator 102, the prime mover 122 experiences the corresponding mechanical loads which cause the rotational speed of the prime mover 106 to vary, accordingly. The prime mover 122 is further coupled with and drives an accessory 124 such as an electrical motor. The mechanical load of the accessory 124 on the prime mover 122 further varies the rotational speed of the latter. In one embodiment, the control device 108 may be configured to further operate as a voltage regulator by sensing an output voltage of the generator 102, via the line 112, and maintaining the output voltage at a regulation voltage, via the line 110, The control device 108 further comprises a sensor 120 capable of measuring a temperature wherein the control device 108 may vary the regulation voltage according to the temperature. The control device 108 further comprises a light emitting diodes (LED) 116 and an I/O port 118 to communicate system information.

In one embodiment, the prime mover 122 is an internal combustion engine, the generator 102 is an alternator, and the coupling mechanism 128 is a drive belt. The internal combustion engine drives the alternator via the drive belt. The generator output power controller 106 is a field coil and the generator speed indicator 104 is a phase winding of the alternator. The line 134 is connected to the phase winding and operative to sense an oscillating voltage proportional to the rotational speed of the shaft 126 of the alternator. The line 110 is connected to the field coil and operative to apply a control signal to the latter thereby varying the output power of the alternator. In this embodiment, the control device 108 measures a change in the rotational speed by determining a difference between two consecutive rotational speed values $\omega_1$ and $\omega_2$, sampled a pre-determined time interval apart. When the change is above a threshold, the control device 108 applies a speed-control signal to the field coil via the line 110 to vary the output power of the alternator. In one instance, the speed-control signal comprises a phase modulated signal causing the average field current to decrease when the change is negative, i.e., the rotational speed of the alternator is decreasing. In another instance, the speed-control signal comprises a step signal causing the average field current to increase when the change is positive, i.e., the speed is increasing.

As stated above, the change in the RPM can have a negative or a positive sign. A negative sign indicates that the engine rotational speed is decreasing and a positive sign indicates that the engine's RPM is increasing. A decreasing RPM can lead to engine stall or other undesired effects on the engine, and an increasing RPM may signify a sudden availability of engine power. In either case, the change can be compared with one or more threshold values to apply an appropriate control signal.

For instance, the system can be configured so that changes in speed, either positive or negative, below a threshold value are ignored, signifying that such changes are within normal operating conditions. On the other hand, speed changes at or above the threshold are acted upon signifying that the system requires adjustments. The change can be compared with a threshold value $R_C$. If the change is at or above this value, a second comparison is performed with respect to the algebraic sign of the change. If the change is negative, i.e., the speed is decreasing, the control device 108 applies a phase modulated signal, causing the generator output power controller 106 to attenuate the generator output power. If the change is positive, the control device 108 applies a step signal, causing the generator output power controller 106 to switch on, thereby restoring the generator output power.

It should be clear to a skilled artisan that the generator output power controller 106 can be a passive or an active component. This means that in the present embodiment, the generator output power controller 106 (the field coil) is a passive component, to the extent that the output power of the generator 102 is controlled by a voltage regulator (not shown) via the field coil. In another embodiment, the generator output power controller 104 is an active component, to the extent that it actively controls the generator output power. A voltage regulator (not shown) capable of controlling the generator output power by controlling the field current can be utilized. In the former case, the control device 108 applies a control signal to the field coil directly which overrides any other control signal acting upon the field coil by the voltage regulator. In the latter case, the control device 108 applies a control signal to the voltage regulator directly causing the voltage regulator to apply the control signal generated by the control device 108 over any other control signal generated by the voltage regulator. Two variations of this embodiment will be discussed in more detail below. In either case, the control device 108 applies a control signal to the generator output power controller 106 to vary the output power of the generator 102 according to a change in speed, and such control signal overrides any other control signal operating to control the generator output power until changes in speed fall within normal operating conditions, and the control device 108 relinquishes control of the otherwise normal generator output power. It is contemplated that in other embodiments, the generator 102 and the control device 108 are each equipped with a wireless transmitter/receiver (not shown but known to skilled artisans) that can replace the line 134 and line 110, wherein the generator 102 transmits the rotational speed of the generator which the control device 108 receives to measure a change, and wherein the control device 108 transmits a control signal which the generator 102 receives to vary its output power according to the change.

In one embodiment, the control device 108 comprises a voltage regulator (discussed below) that maintains the output voltage of the generator 102 at a regulation voltage, for instance 28 Volts. The control device 108 achieves this by sensing the output voltage of the generator 102 by measuring a voltage of the line 112 and switching on/off the field coil via the line 110 to maintain the output voltage substantially at the regulation voltage. According to this embodiment, the control device 108 operates to control the generator output power at all times including those when the change in speed is below any event-specific threshold. In a variation of the present embodiment, the sensor 120 is utilized to measure a temperature, for example the temperature of a battery (not shown), and vary the regulation voltage according to the temperature.

According to another embodiment, the generator 102 is a permanent magnet alternator, the prime mover 122 is a pneumatic or fluid powered engine, and the coupling mechanism 128 is a direct drive coupling. In one configuration, the alternator shaft 126 is mated with a drive coupling of shaft 130. The generator output power controller 106 is a silicon controlled rectifier (SCR) and the generator speed indicator 104 is a tachometer. The control device 108 senses a rotational speed of the alternator via the line 134 and applies a control signal according to a measured change in the speed, via the line 110, operative to vary the output power of the alternator.

It should be clear to a skilled artisan that the generator output power controller 106 can be a passive or an active component. This means that in the present embodiment, the generator output power controller 106 (the SCR) is a passive component, to the extent that the output power of the generator 102 is controlled by a voltage regulator (not shown) via the SCR. In another embodiment, the generator output power controller 106 is an active component, to the extent that it actively controls the generator output power. A voltage regulator (not shown) capable of providing a signal indicative of the field coil duty cycle can be utilized. A voltage regulator (not shown) capable of controlling the generator output power by switching on/off the SCR can be utilized. In the former case, the control device 108 applies a control signal to the SCR directly which overrides any other control signal acting upon the SCR by the voltage regulator. In the latter case, the control device 108 applies a control signal to the voltage regulator directly causing the voltage regulator to apply the control signal generated by the control device 108 over any other control signal generated by the voltage regulator. In either case, the control device 108 applies a control signal to the generator output power controller 106 to vary the output power of the generator 102 according to a change in speed, and such control signal overrides any other control signal operating to control the generator output power until changes in speed fall within normal operating conditions, and the control device 108 relinquishes control of the otherwise normal generator output power.

Figure 2:
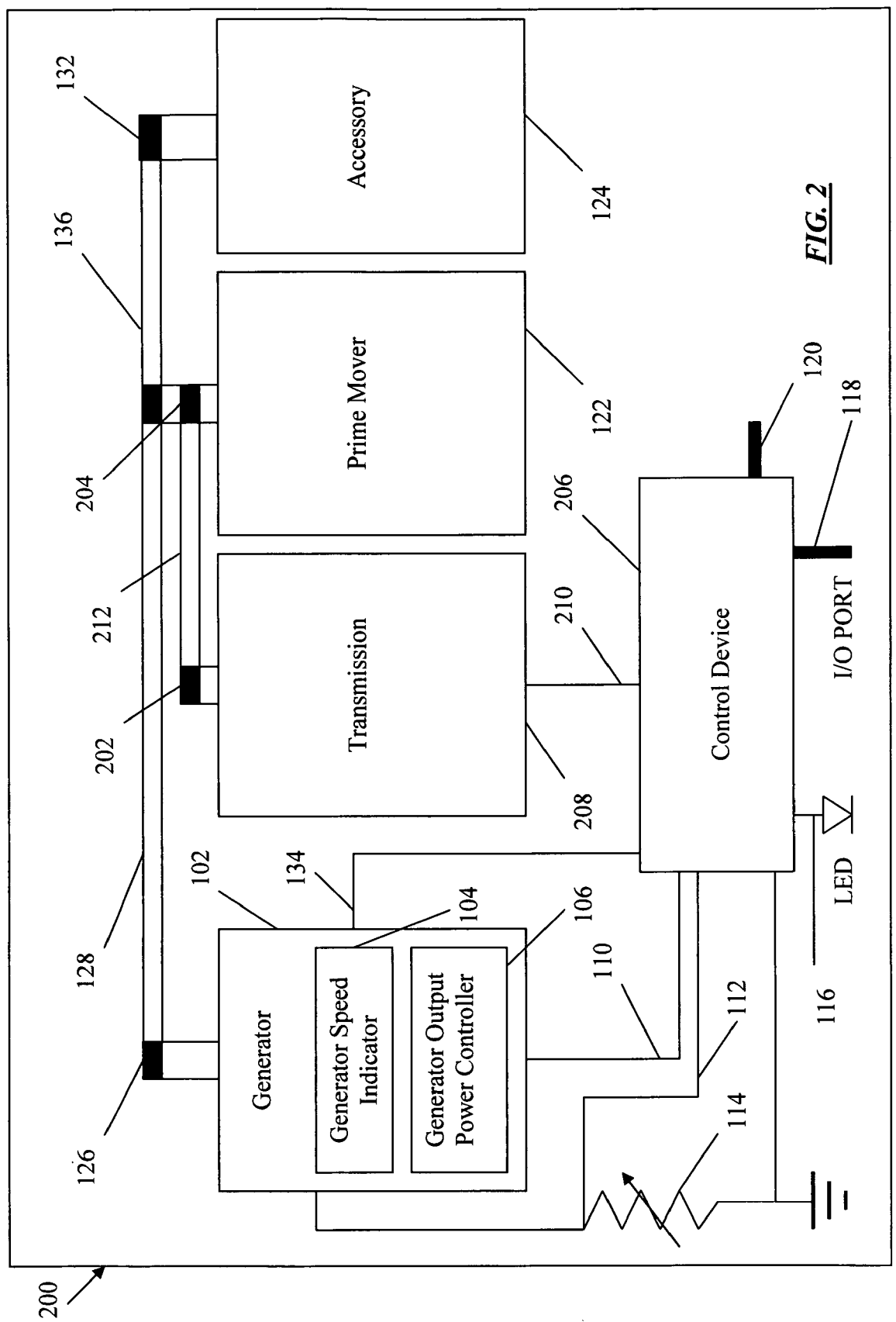
FIG. 2 shows a block diagram of a power control system according to a preferred embodiment.

FIG. 2 depicts a block diagram of a preferred embodiment of a power control system 200, including a prime mover 122, generator 102, accessory 124, control device 206, and transmission 208. This configuration is well adapted for applications in motor vehicles, where the prime mover 122 is an internal combustion engine and the transmission 208 is coupled to the engine via a coupling mechanism 212 and utilized to propel the vehicle. In this embodiment, the generator 102 is coupled with the engine via a coupling mechanism 128. The control device 206 is connected to and in communication with the generator 102 in a similar manner as shown in FIG. 1. In this embodiment, the control device 206 is configured to measure a change in generator RPM via the line 134 and apply a control signal to the generator output power controller 106, via the line 110, according to the change. According to this embodiment, the control device 206 controls the generator output power at all times regardless of the state of the transmission 208. In another embodiment, the control device 206 may be connected to and in communication with the transmission 208 via a line 210 to monitor the state of the transmission 208, and become operative only when the transmission state is set to specific states, for example neutral or parked.

For instance, in a vehicle application, the transmission 208 is engaged by the vehicle operator to propel the vehicle. During the period when the transmission 208 is so engaged, the control device 206 is signaled, via the line 210, that the generator output power should not be controlled based on a change in generator speed. When the vehicle operator sets the transmission 208 to either a neutral or parked state, the control device 206 senses this condition via the line 210 and commences to vary the output power of the generator according to the measured change in the rotational speed of the generator 102. In another instance, in a vehicle application, the control device 206 may be configured to control the generator output power regardless of the state of the transmission 208. Accordingly, acceleration and deceleration of the vehicle engine cause the control device 206 to control the generator output power based on a change in RPM as described above.

Figure 3:
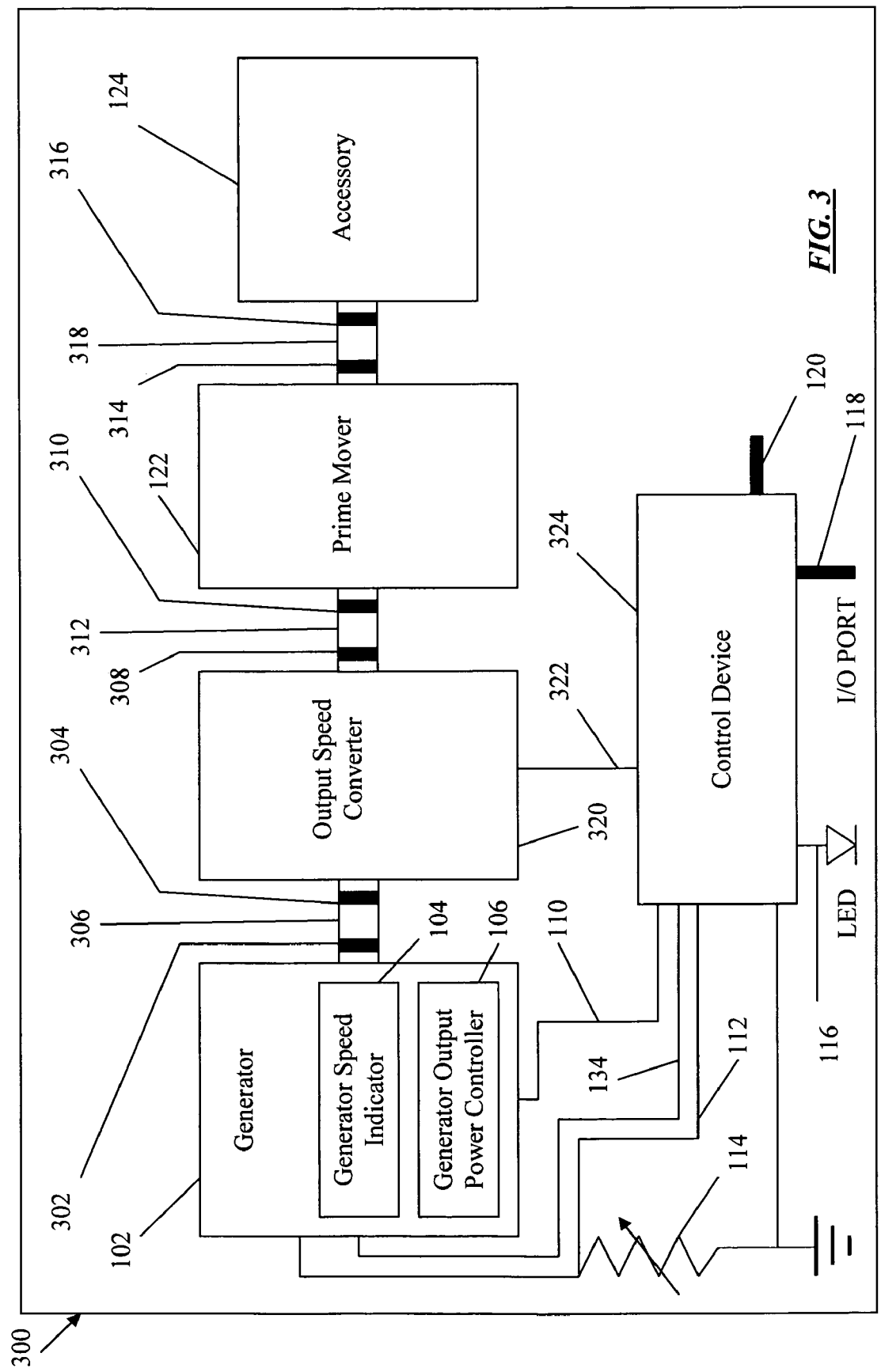
FIG. 3 shows a block diagram of a power control system according to a preferred embodiment.

FIG. 3 depicts a block diagram of a preferred embodiment of a power control system 300, including a prime mover 122, generator 102, accessory 124, control device 324, and output speed converter 320. The control device 324 is connected to and in communication with the generator 102 in a similar manner as shown in FIG. 1. The output speed converter 320 is coupled with the prime mover 122, via a coupling mechanism 312, and the generator 102, via a coupling mechanism 306. The control device 324 is configured to measure a change in the generator speed, via the line 134 and apply a control signal to the generator output power controller 106 via the line 110 according to the change.

An example of the present embodiment is where the prime mover 122 is a turbine engine and the output speed converter 320 is a power train that converts a rotational speed of an output shaft 310 of the turbine engine to a variable speed of the power train. An input shaft 308 of the output speed converter 320 is coupled with the output shaft 310 of the turbine engine via the coupling mechanism 312, for instance a direct drive coupling of the type discussed above, and rotates at the same speed as the turbine engine output shaft 310. An output shaft 304 of the output speed converter 320 is coupled with a shaft 302 of the generator 102 via the coupling 306 which may be a direct drive coupling of the type discussed above. As the speed of the output speed converter 320 changes, the control device 324 measures a change in the rotational speed of the generator 102, via the first line 134, and applies a control signal, via the line 110, to vary the output power of the generator 102 according to the change.

Figure 4:
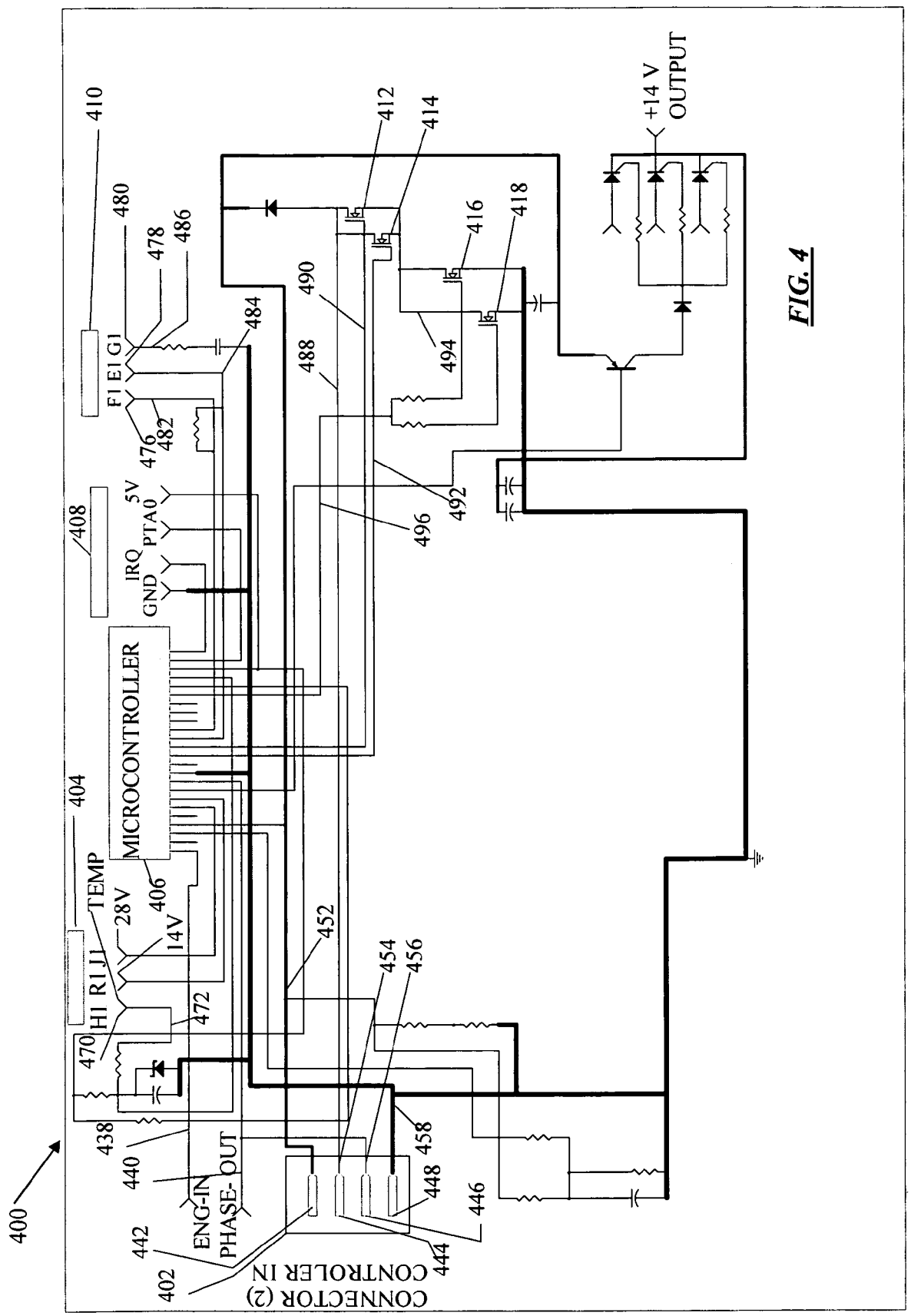
FIG. 4 is a schematic diagram of a preferred embodiment of a control device included in the power control system of FIG. 1, FIG. 2, or FIG. 3.

FIG. 4 depicts a schematic diagram of a preferred embodiment of a control device 400 as an electrical circuit. In this embodiment, the control device comprises a processor 406. The processor 406 preferably comprises a microprocessor, a processor clock, and a power supply. In one preferred embodiment, the microprocessor is a 68C08 processor having internal flash memory available from Motorola, Inc. of Schaumburg, Ill. The internal clock may be a crystal-type oscillator or other oscillator mechanism known to those practiced in the art, and the power supply may be a discrete or integrated circuit configured to supply the processor 406 with appropriate DC voltage. It is contemplated that the processor may be a combination of individual discrete or separate integrated circuits packaged in a single housing or it may be fabricated in a single integrated circuit.

The processor 406 is connected to and in communication with a generator (not shown) via a connector 402. The processor 406 is further connected to and in communication with MOSFETS 412, 414, 416, and 418 wherein the processor 406 may regulate an output voltage of the generator at a regulation voltage. It should be clear to a skilled artisan that when the control device is operating to control the generator output power only in response to a change in speed of the generator, only the MOSFET 412 is required to perform the task. When the control device operates further to regulate the output voltage one or more of the MOSFETS 412 thru 418 may be utilized to perform the task. Two different embodiments of the control device further operating as a voltage regulator will be discussed below, wherein one embodiment the control device utilizes two separate MOSFETS such as the MOSFETS 412 and 416, and wherein the other embodiment the control device utilizes a single MOSFET such as the MOSFET 412. Utilization of the other two MOSFETS 414 and 418 is to provide redundant and over voltage protection as discussed below. The processor 406 is further connected to and in communication with a temperature sensor and an I/O port via connectors 404 and 410, respectively.

In one embodiment, the connector 402 comprises four separate terminals, namely an ALT terminal 442, an F-terminal 444, an AC terminal 446, and a GND terminal 448. Preferably, the ALT terminal 442 is used to couple to an output terminal of the generator via a line 452, the F-terminal 444 is used to couple with an output power controller of the generator, for instance, a field coil via a line 454, the AC terminal 446 is used to couple with a phase terminal of the generator via a line 456, and the GND terminal 448 is used to couple with a ground terminal via a line 458, providing a return path for the current flow. Preferably, the processor 406 utilizes: (1) the ALT terminal 442 to measure an output voltage of the generator, (2) the F-terminal 444 to vary the generator output power, (3) the AC terminal 446 to ascertain a change in the generator speed, and (4) the GND terminal 448 to access a ground terminal.

In one embodiment, the connector 450 is utilized to connect to and communicate with the transmission. Preferably, the PI terminal 428 is utilized to couple with the transmission via a line 460.

In one embodiment, the processor 406 connects to and communicates with MOSFETS 412, 414, 416, and 418, via lines 488, 490, 492, 494, 496, and 458. Preferably, MOSFETS 412 and 414 are coupled in a parallel configuration and are utilized to regulate an output voltage of the generator at a regulation voltage, for instance 28 V, and MOSFETS 416 and 418 are also coupled in a parallel configuration, and are utilized to protect the generator from excessive voltage, for instance, 30 V a condition commonly referred to as an over voltage cut off (OVCO) condition. Other transistors instead of the MOSFETS may be utilized to perform the same task as known by skilled artisans Furthermore, it should be clear to a skilled artisan that a single transistor can be used to regulate the voltage and that multiple transistors are used here to provide redundant and OVCO protection.

In one embodiment, the processor 406 connects to and communicates with a temperature sensor (not shown) via a terminal 470 of the connector 404. Preferably, the processor 406 utilizes a line 472 to measure a temperature, for instance an ambient temperature, to compensate the regulation voltage accordingly. In another embodiment, the processor 406 connects to and communicates with a computer system via a CAN-L terminal 476, CAN-H terminal 478, and GND terminal 480 of the connector 410. Preferably, the processor 406 utilizes lines 482, 484, and 486 to transmit/receive system information. In one variation of the present embodiment, the processor 406 utilizes a CAN Protocol to exchange system information.

Figure 5:
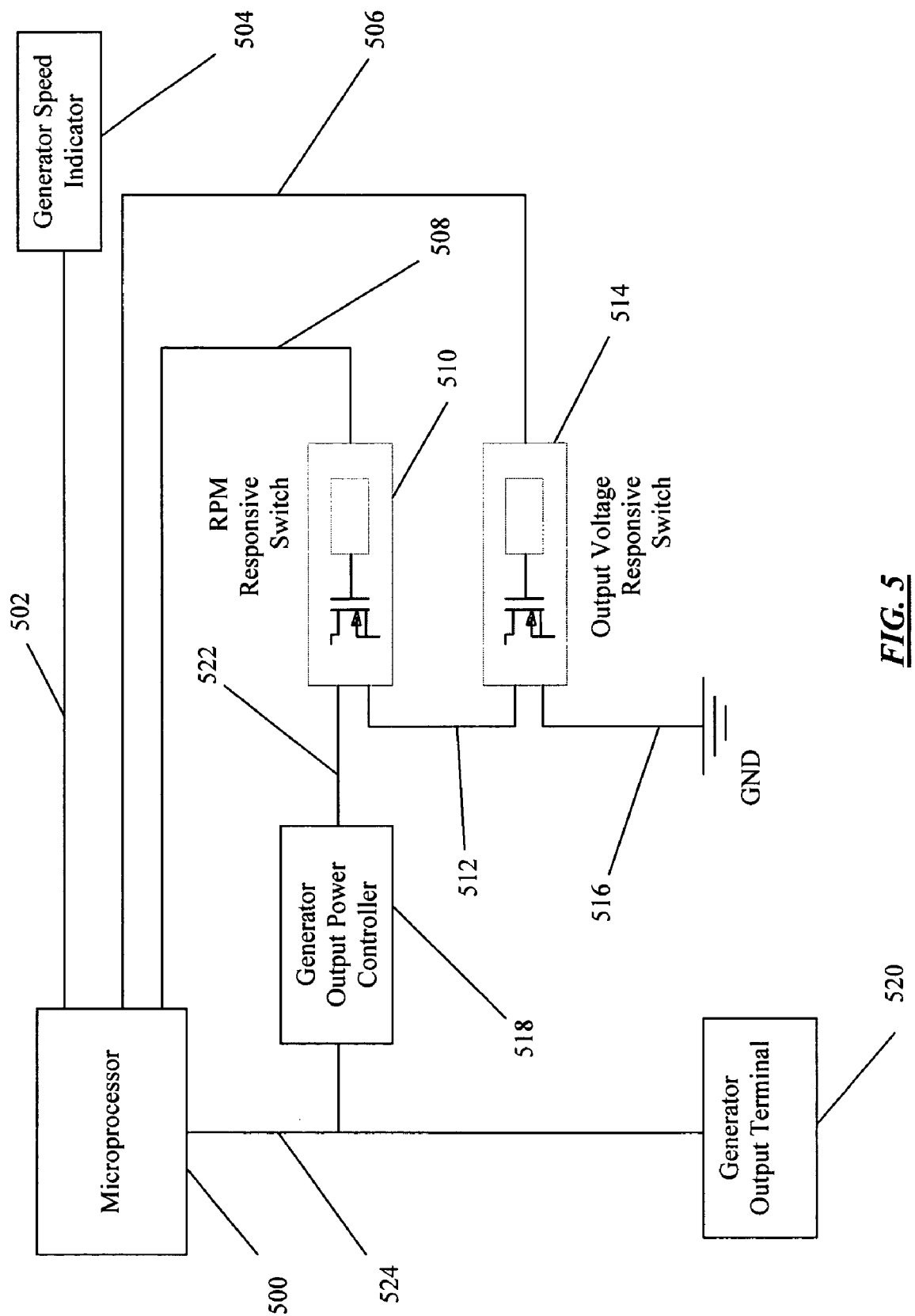
FIG. 5 is a schematic diagram of a preferred embodiment of a control device included in the power control system of FIG. 1, FIG. 2, or FIG. 3, further operating as a voltage regulator.
Figure 6:
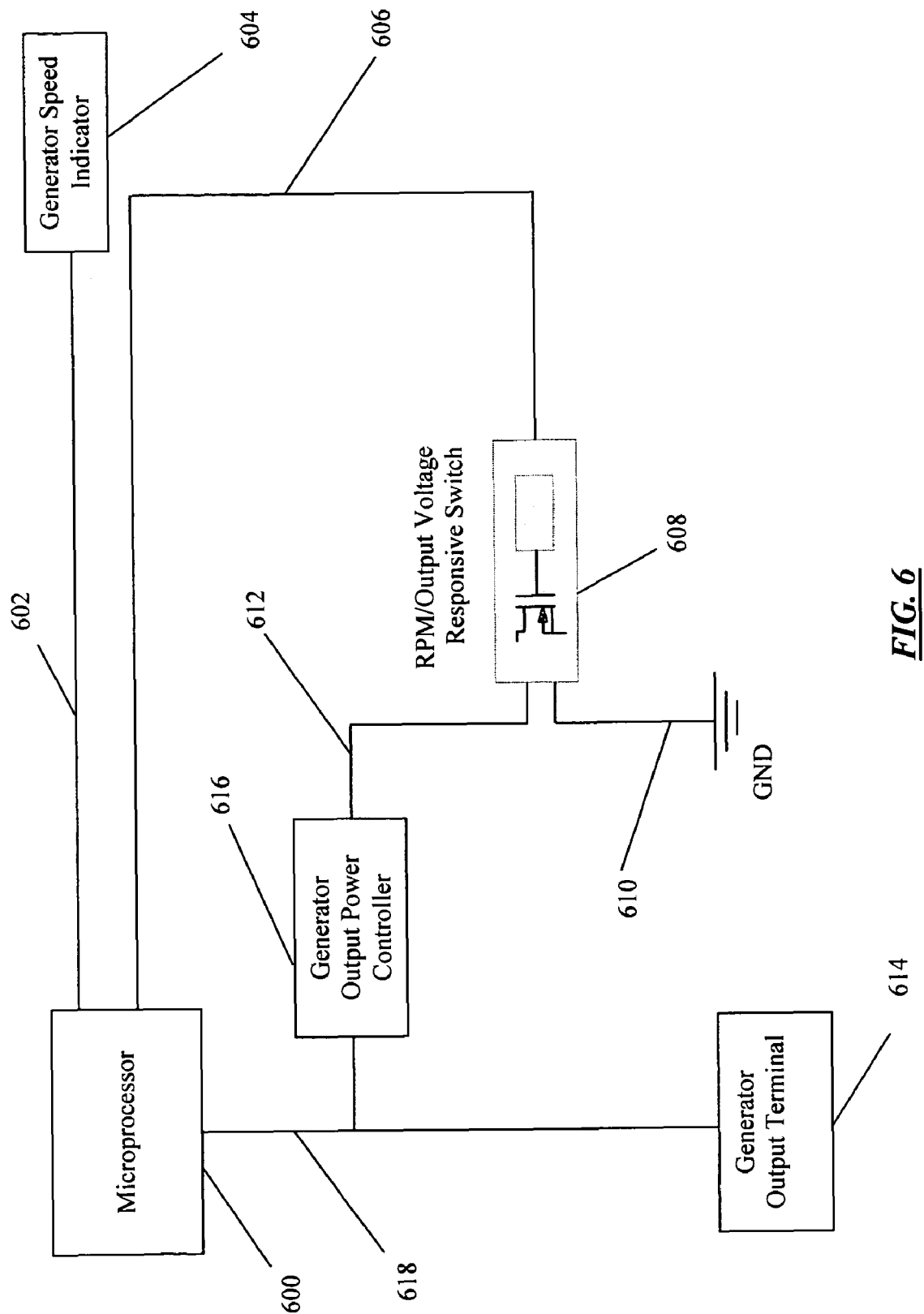
FIG. 6 is a schematic diagram of a preferred embodiment of a control device included in the power control system of FIG. 1, FIG. 2, or FIG. 3, further operating as a voltage regulator.

Referring to FIG. 4 and utilizing FIG. 5 and FIG. 6, two embodiments of the control device 400 are discussed where the control device 400 further operates as a voltage regulator. In both embodiments, the control device 400 operates to control the generator output power based on generator output voltage and changes in generator RPM. Consequently, a generator, included in a power conversion system such as those depicted in FIG. 1, FIG. 2, or FIG. 3, can be controlled not only based on its output power capacity, but also how its output power affects the power conversion system.

In FIG. 5, a microprocessor 500 is connected with a generator speed indicator 504, via a line 502, with a generator output power controller 518, via a line 522, and with a generator output terminal 520, via a line 524. The generator speed indicator 504 may be a tachometer or a generator phase winding. The generator output power controller may be a field coil or an SCR. The microprocessor 500 is configured to regulate an output voltage of the generator (not shown) at a regulation voltage $V_R$, by switching on/off an output voltage responsive switch 514, such as MOSFET 412, shown in FIG. 4.

Under normal operating conditions, i.e., speed changes less than a threshold value $R_C$, the microprocessor 500 switches on/off the output voltage responsive switch 514, via a line 506, to maintain the output voltage of the generator at the regulation voltage $V_R$, and keeps an RPM responsive switch 510 switched on, via a line 508. When a change in speed is at or above the threshold value $R_C$, the microprocessor 500 applies a control signal to the RPM responsive switch 510, via the line 508. If the change is negative, i.e., the RPM is decreasing, the microprocessor 500 applies a phase modulated signal to the RPM responsive switch 510, via the line 508, to reduce the generator output power. If the change is positive, i.e., the RPM is increasing, the microprocessor 500 applies a step signal to the RPM responsive switch 510, via the line 508, to restore the generator output power.

In FIG. 6, a microprocessor 600 is connected with a generator speed indicator 604, via a line 602, with a generator output power controller 616, via a line 612, and with a generator output terminal 614, via a line 618. The generator speed indicator 604 may be a tachometer or a generator phase winding. The generator output power controller may be a field coil or an SCR. The microprocessor 600 is configured to regulate an output voltage of the generator (not shown) at a regulation voltage $V_R$, by switching on/off an RPM/Output voltage responsive switch 608, such as MOSFET 412, shown in FIG. 4. This embodiment differs from that depicted in FIG. 5 in that a single switch can be utilized to control the generator output power based on generator output voltage and speed.

Under normal operating conditions, i.e., speed changes less than a threshold value $R_C$, the microprocessor 600 switches on/off the RPM/Output voltage responsive switch 608, via a line 606, to maintain the output voltage of the generator at the regulation voltage $V_R$. When a change in speed is at or above the threshold value $R_C$, the microprocessor varies the regulation voltage $V_R$ according to the change. If the change is negative, i.e., the RPM is decreasing, the microprocessor 600 reduces the regulation voltage $V_R$. If the change is positive, i.e., the RPM is increasing, the microprocessor 600 restores the regulation voltage $V_R$.

Utilizing the system 100 described in FIG. 1, one embodiment of the operation of the control device 108 is now described. The generator 102 is a permanent magnet alternator having an SCR as an output power controller 106 and the prime mover 122 is an internal combustion engine. The control device 108 ascertains a change in the speed of the alternator via the generator speed indicator 104 and varies an output power of the generator according to the change. This embodiment may readily be implemented in a generator set available from C. E. Niehoff & Co., Evanston, Ill.

In one situation, the control device 108 senses a voltage variation from a signal received via the line 134. A processor, such as the processor 406 depicted in FIG. 4 and included in the control device 108, calculates a change in the RPM (as described above), utilizing an onboard programming code stored in the memory of the processor 406. This change is compared with a threshold value $R_C$. If the absolute value of the change is less than $R_C$, the processor 406 does not change the generator output power. When the change is at or above $R_C$, the control device 108 applies a control signal to the generator output power controller 106, via the line 110, to either reduce or restore the generator output power. When the algebraic sign of the change is negative, i.e., the speed is decreasing, the control device 108 applies a control signal, such as a phase modulated signal, to the generator output power controller 106 to attenuate the generator output power. When the algebraic sign of the change is positive, i.e., the speed is increasing, the control device 108 applies a control signal, such as a step signal, to the generator output power controller 106 to restore the generator output power.

In one embodiment, the above control device 108 may further operate to regulate the output voltage of the generator 102. Referring to FIG. 5, the processor 500 senses a signal, via the line 502, from the generator speed indicator 504, say a phase winding of the generator 102, to measure a change in speed of the generator 102. The processor 500 further senses a signal, via the line 524, from the generator output terminal 520, to measure an output voltage of the generator 102. The processor 500 applies a voltage-control signal to the output voltage responsive switch 514, via the line 506, to regulate the output voltage of the generator 102 at a regulation voltage $V_R$. The processor 500 applies a speed-control signal to the RPM responsive switch 510, via the line 508, if a change in speed is at or above a threshold value $R_C$. Accordingly, the control device 108 controls the output power of the generator 102 based on change in speed and output voltage of the generator 102.

Utilizing the system 200 described in FIG. 2, one embodiment of the operation of the control device 206 is now described. The generator 102 is a brushless alternator having a field coil as an output power controller 106, available from C.E. Niehoff & Co. of Evanston, Ill. The prime mover 122 is an internal combustion engine. The transmission 208 is engaged via a transmission control module (not shown but known to skilled artisans). The control device 206 ascertains a change in the rotational speed of the alternator and varies an output power of the alternator according to the change when the transmission control module is set to either a neutral or parked position. This embodiment may readily be implemented in a motor vehicle.

In one situation, the system 200 is utilized to power and propel the vehicle, utilizing the engine and transmission, and provide electrical power to the vehicle accessories, represented by the variable load 114, utilizing the alternator. The mechanical load imparted on the engine by the accessory 124 is representative of other mechanical loads on the engine. The control device 206 monitors a signal via the line 210 to determine the state of the transmission 208. When the vehicle operator sets said state to either neutral or parked, the control device commences to control the output power of the alternator. A processor, such as the processor 406 depicted in FIG. 4 and included in the control device 206, calculates a change in the RPM (as described above), utilizing an onboard programming code stored in the memory of the processor 406. As described above, this change is compared with a threshold value $R_C$ and an appropriate control signal is applied to the generator output power controller 106 to control the generator output power controller.

In one embodiment, the control device 206 may further operate to regulate the output voltage of the generator 102. Referring to FIG. 6, the processor 600 senses a signal, via the line 602, from the generator speed indicator 604 to measure a change in the generator speed. The processor 600 further senses a signal, via the line 618, from the generator output terminal 614, to measure an output voltage of the generator 102. The processor 600 applies a voltage-control signal to the RPM/Output voltage responsive switch 608, via the line 606, to regulate the output voltage of the generator 102 at a regulation voltage $V_R$, for instance 14 V. The processor 600 varies the regulation voltage $V_R$ if a change in speed is at or above a threshold value $R_C$. If the algebraic sign of the change is negative, the processor 600 reduces the regulation voltage $V_R$, and if the algebraic sign of the change is positive, the processor 600 restores the regulation voltage $V_R$. Accordingly, the control device 206 controls the output power of the generator 102 based on change in speed and output voltage of the generator 102.

In another situation, the system 200 may readily be used when the state of the transmission 208 is set to drive condition. According to this embodiment, the control device 206 senses a rotational speed of the alternator and varies the generator output power when a change in the RPM is at or above a threshold value $R_C$, as described above. In one variation of the present embodiment, the processor 406 may be configured (programmed) to cyclically measure the change and control the generator output power according to the change. In another variation, a special purpose integrated circuit may be configured to interrupt (hardware interrupt) the processor 406 when a change is at or above the threshold value $R_C$. Consequently, there are no preferences given to the state of the transmission 208 and the present invention can be implemented in a vehicle throughout all operating conditions.

Utilizing the system 300 described in FIG. 3, one embodiment of the operation of the control device 324 is now described. The generator 102 is a brushless alternator having a field coil as an output power controller 106. The prime mover 122 is a turbine engine. The output speed converter 320 is a power train that is coupled with the engine and the alternator. The power train operates to convert a rotational speed of the turbine output shaft. The control device 324 ascertains a change in the rotational speed of the alternator and varies the output power of the alternator according to the change. This embodiment may readily be implemented in an aircraft.

In one embodiment, as described above, the control device 324, operates to control the generator output power based on change in speed only. In another embodiment, as described above, where the control device 324 further operates as a voltage regulator, the control device 324 controls the generator output power based on both the change in speed and output voltage of the generator 102. As described above, two different implementations can be utilized according to FIG. 5 and FIG. 6. In the former, FIG. 5, two separate switches are utilized, one to control the generator output power according to the changes in speed of the generator, and the other to control the generator output power based on the generator output voltage. In the latter, FIG. 6, one switch is utilized to control the generator output power based on change in speed and output voltage, by varying the regulation voltage $V_R$ as described above.

Figures 7A, 7B:
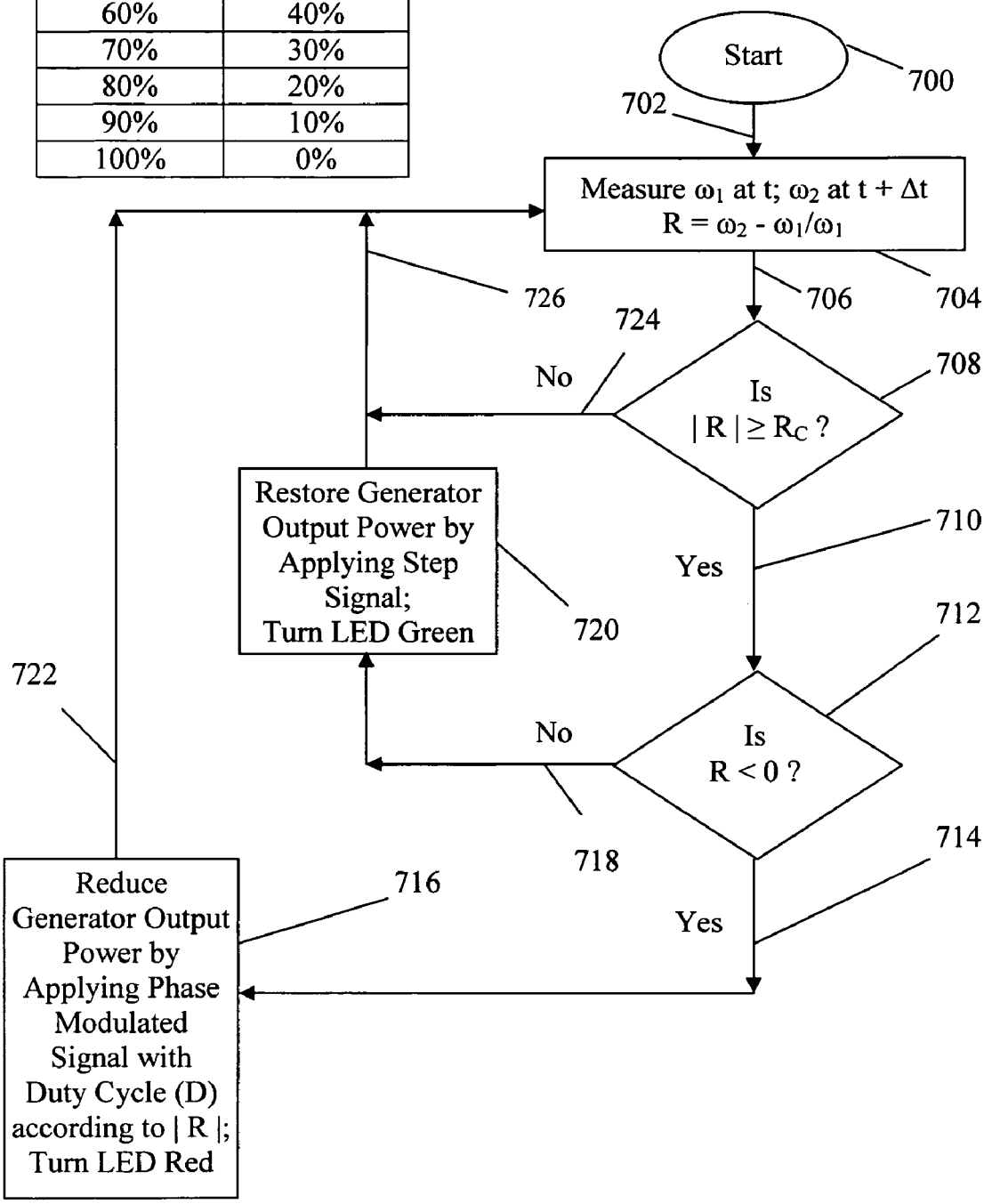
FIG. 7A is a flow diagram of one preferred method of operation of the power control system of FIG. 1, FIG. 2, or FIG. 3.
FIG. 7B is a diagram of one preferred method of applying a phase modulated signal corresponding to FIG. 7A.

FIGS. 7A and 7B illustrate an example of one method of operating the control device 108, utilizing FIGS. 1 and 4, where the control device 108 operates to control the output power of the generator 102 based only on changes in the generator speed. Upon power up at 700, the processor 406 measures a change in speed (R), at 704, of the generator 102, via the line 134. The absolute value of the change (R) is then compared to a threshold value $R_C$ at 708. If this value is less than the threshold value $R_C$, the processor 406 will not affect the generator output power, branching at 724 to continue measuring a change (R) in the speed of the generator 102. If, however, the absolute value of the change (R) is at or above the threshold value $R_C$, the processor 406 branches at 710 and performs a comparison on the algebraic sign of the change (R) at 712. If the change (R) is negative, the processor 406 branches at 714 and operates to reduce the generator output power by applying a phase modulated signal to the MOSFET 412 with duty cycle (D) at 716. In one variation of the present embodiment, the processor 406 uses a look up table, stored in the memory of the processor 406, as depicted in FIG. 7B. The look up table is utilized to relate the duty cycle (D) to the change (R), at 728. The processor 406 branches at 722 to continue measuring a change (R) in the speed of the generator 102. If the change (R) is positive, the processor 406 branches at 718 and operates to restore the generator output power by applying a step signal to the MOSFET 412 at 720. In one variation, the step signal is a signal that switches on the MOSFET 412. The processor 406 branches at 726 to continue measuring a change (R) in the speed of the generator 102.

FIGS. 8A and 8B illustrate an example of one method of operating the control device 108, utilizing FIGS. 2 and 5, where the control device 108 operates to control the output power of the generator 102 based on both changes in the generator speed and generator output voltage. Upon power up at 800, the processor 500 regulates the generator output voltage at 804 at a regulation voltage $V_R$ by sensing an output voltage of the generator via the line 524. The regulation is performed by the output voltage responsive switch 514, as described above. The processor 500 branches at 806 to measure a change in speed (R) of the generator 102, at 808, via the line 502, which is coupled with the generator speed indicator 504. The absolute value of the change (R) is then compared to a threshold value $R_C$ at 812. If this value is less than the threshold value $R_C$, the processor 500 will not affect the generator output power, branching at 828 to continue regulating the generator output voltage. If, however, the absolute value of the change (R) is at or above the threshold value $R_C$, the processor 500 branches at 814 and performs a comparison on the algebraic sign of the change (R) at 816. If the change (R) is negative, the processor 500 branches at 818 and operates to reduce the generator output power by applying a phase modulated signal to RPM responsive switch 510 with duty cycle (D) at 820. In one variation of the present embodiment, the processor 500 uses a look up table, stored in its memory, as depicted in FIG. 8B. The look up table is utilized to relate the duty cycle (D) to the change (R), at 832. The processor 500 branches at 824 to continue regulating the generator output voltage. If the change (R) is positive, the processor 500 branches at 822 and operates to restore the generator output power by applying a step signal to RPM responsive switch 510 at 826. The processor 500 branches at 830 to continue regulating the generator output voltage.

FIGS. 9A and 9B illustrate an example of one method of operating the control device 108, utilizing FIGS. 3 and 6, where the control device 108 operates to control the output power of the generator 102 based on both changes in the generator speed and generator output voltage. Upon power up at 900, the processor 600 regulates the generator output voltage at 904 at a regulation voltage $V_R$ at 904 by sensing an output voltage of the generator via the line 618. The regulation is performed by the RPM/Output voltage responsive switch 608, as described above. The processor 600 branches at 906 to measure a change in speed (R) of the generator 102, at 908, via the line 602, which is coupled with the generator speed indicator 604. The absolute value of the change (R) is then compared to a threshold value $R_C$ at 912. If this value is less than the threshold value $R_C$, the processor 600 will not affect the generator output power, branching at 928 to continue regulating the generator output voltage. If, however, the absolute value of the change (R) is at or above the threshold value $R_C$, the processor 600 branches at 914 and performs a comparison on the algebraic sign of the change (R) at 916. If the change (R) is negative, the processor 600 branches at 918 and operates to reduce the generator output power by reducing the regulation voltage $V_R$ at 920. In one variation of the present embodiment, the processor 600 uses a look up table, stored in its memory, as depicted in FIG. 9B. The look up table is utilized to relate the amount of reduction in the regulation voltage $V_R$ to the change (R), at 932. The processor 600 branches at 924 to continue regulating the generator output voltage. If the change (R) is positive, the processor 600 branches at 922 and operates to restore the generator output power by restoring the regulation voltage $V_R$ at 926. The processor 600 branches at 930 to continue regulating the generator output voltage.

In FIGS. 7A thru 9B, the processor may be configured to communicate one or more system status via an LED 116 or an I/O port 118, as depicted in FIG. 1, following applying the appropriate control signal. It should be clear to a skilled artisan that the program included in the processor may operate to regulate the generator output voltage concurrently with measuring the change in generator speed. As described above, the change measurements can either be performed cyclically or interrupt driven.

The forgoing discloses a power control system comprising a control device, a prime mover, and a generator. The prime mover drives the generator and the control device ascertains a change in speed of the generator and varies an output power of the generator according to the change. The system may include a transmission where the control device operation is conditioned on whether the transmission is in a particular state, or regardless of the state of the transmission. The system may include a speed converter coupled with the prime mover wherein the control device operates to vary the generator output power according to a change in speed of the generator. The control device may also operate to control an output power of the generator, for instance, operate to regulate an output voltage of the generator.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A control device for a generator driven by a prime mover, said generator, coupled with one or more electrical loads, comprising a generator output power controller capable of manipulating an output power of the generator and a generator speed indicator capable of generating a signal indicative of the generator speed, said control device comprising:
    a processor, including a programming code operable on the processor, coupled with the generator output power controller and the generator speed indicator;
    wherein said processor is configured to measure a rate of change in speed of the generator, via a first line, and to vary the output power of the generator by applying a speed-control signal to the generator output power controller, via a second line, according to said rate of change regardless of electrical power required by the one or more electrical loads.

2. The control device of claim 1, wherein the speed-control signal comprises at least one of a phase modulated signal and step signal when the rate of change is above a threshold value.

3. The control device of claim 2, wherein the speed-control signal comprises a phase modulated signal when the algebraic sign of the rate of change is negative.

4. The control device of claim 3, wherein a duty cycle of the phase modulated signal is in proportion to the rate of change.

5. The control device of claim 4, wherein said proportionality is obtained from a look up table.

6. The control device of claim 4, wherein said proportionality is obtained from a functional relationship.

7. The control device of claim 2, wherein the speed-control signal comprises a step signal when the algebraic sign of the rate of change is positive.

8. The control device of claim 1, further comprising means for communicating system information.

9. The control device of claim 8, wherein said communication means comprises a communication terminal, coupled with a computer system, capable of transmitting/receiving a communication signal indicative of said system information.

10. The control device of claim 8, wherein said communication means comprises a light emitting diode, generating a flashing light pattern indicative of said system information.

11. The control device of claim 1, wherein the processor is further configured to measure an output voltage of the generator, via a third line, and apply a voltage-control signal to the generator output power controller, via a fourth line, to maintain the output voltage substantially at a regulation voltage.

12. The control device of claim 1, wherein the processor is further configured to measure an output voltage of the generator, via a third line, and apply a voltage-control signal to the generator output power controller, via the second line, to maintain the output voltage substantially at a regulation voltage, and wherein the regulation voltage is varied according to said rate of change.

13. The control device of claim 12, wherein the processor is configured to at least one of reduce and restore the regulation voltage when the rate of change is above a threshold value.

14. The control device of claim 13, wherein the processor is configured to reduce the regulation voltage when the algebraic sign of the rate of change is negative.

15. The control device of claim 13, wherein the processor is configured to restore the regulation voltage when the algebraic sign of the rate of change is positive.

16. A control device for a generator driven by a prime mover, said generator comprising a generator output power controller capable of manipulating an output power of the generator and a generator speed indicator capable of generating a signal indicative of the generator speed, said control device comprising:
a processor, including a programming code operable on the processor, coupled with the generator output power controller and the generator speed indicator;
wherein said processor is configured to measure a rate of change in speed of the generator, via a first line, and to vary the output power of the generator by applying a speed-control signal to the generator output power controller, via a second line, according to said rate of change, wherein the speed-control signal comprises at least one of a phase modulated signal and step signal when the rate of change is above a threshold value, wherein the speed-control signal comprises a phase modulated signal when the algebraic sign of the rate of change is negative and wherein a duty cycle of the phase modulated signal is in proportion to the rate of change.

17. The control device of claim 16, wherein said proportionality is obtained from a look up table.

18. The control device of claim 16, wherein said proportionality is obtained from a functional relationship.

19. A control device for a generator driven by a prime mover, said generator comprising a generator output power controller capable of manipulating an output power of the generator and a generator speed indicator capable of generating a signal indicative of the generator speed, said control comprising:
a processor, including a programming code operable on the processor, coupled with the generator output power controller and the generator speed indicator;
wherein said processor is configured to measure a rate of change in speed of the generator, via a first line, and to vary the output power of the generator by applying a speed-control signal to the generator output power controller, via a second line, according to said rate of change, and wherein the processor is further configured to measure an output voltage of the generator, via a third line, and apply a voltage-control signal to the generator output power controller, via a fourth line, to maintain the output voltage substantially at a regulation voltage.

20. A control device for a generator driven by a prime mover, said generator comprising a generator output power controller capable of manipulating an output power of the generator and a generator speed indicator capable of generating a signal indicative of the generator speed said control device comprising:
a processor, including a programming code operable on the processor, coupled with the generator output power controller and the generator speed indicator;
wherein said processor is configured to measure a rate of change in speed of the generator, via a first line, and to vary the output power of the generator by applying a speed-control signal to the generator output power controller, via a second line, according to said rate of change, and wherein the processor is further configured to measure an output voltage of the generator, via a third line, and apply a voltage-control signal to the generator output power controller, via the second line, to maintain the output voltage substantially at a regulation voltage, and wherein the regulation voltage is varied according to said rate of change.

21. The control device of claim 20, wherein the processor is configured to at least one of reduce and restore the regulation voltage when the rate of change is above a threshold value.

22. The control device of claim 21, wherein the processor is configured to reduce the regulation voltage when the algebraic sign of the rate of change is negative.

23. The control device of claim 21, wherein the processor is configured to restore the regulation voltage when the algebraic sign of the rate of change is positive.

24. A control device for a generator, said generator, coupled with one or more electrical loads, comprising a shaft driven at a speed, a generator output power controller capable of manipulating an output power of the generator, and a generator speed indicator capable of generating a signal indicative of the generator speed, said control device comprising:
a processor, including a programming code operable on the processor, coupled with the generator output power controller and the generator speed indicator;
wherein said processor is configured to measure a rate of change in speed of the generator, via a first line, and to vary the output power of the generator by applying a speed-control signal to the generator output power controller, via a second line, according to said rate of change regardless of electrical power required by the one or more electrical loads.

25. A method for controlling a generator driven by a prime mover, said generator, coupled with one or more electrical loads, comprising a generator output power controller capable of manipulating an output power of the generator and a generator speed indicator capable of generating a signal indicative of the generator speed, said method comprising:
(a) measuring a rate of change in speed of the generator, via a first line; and (b) varying the output power of the generator by applying a speed-control signal to the generator output power controller, via a second line, according to said rate of change regardless of electrical power required by the one or more electrical loads.

26. The method of claim 25, wherein the speed-control signal comprises at least one of a phase modulated signal and step signal when the rate of change is above a threshold value.

27. The method of claim 26, wherein the speed-control signal comprises a step signal when the algebraic sign of the rate of change is positive.

28. The method of claim 26, wherein the speed-control signal comprises a phase modulated signal when the algebraic sign of the rate of change is negative.

29. The method of claim 28, wherein a duty cycle of the phase modulated signal is in proportion to the rate of change.

30. The method of claim 29, wherein said proportionality is obtained from a look up table.

31. The method of claim 29, wherein said proportionality is obtained from a functional relationship.

32. The method of claim 25, further comprising communicating system information.

33. The method of claim 25, further comprising measuring an output voltage of the generator, via a third line, and applying a voltage-control signal to the generator output power controller, via a fourth line, to maintain the output voltage substantially at a regulation voltage.

34. The method of claim 25, further comprising measuring an output voltage of the generator, via a third line, and applying a voltage-control signal to the generator output power controller, via the second line, to maintain the output voltage substantially at a regulation voltage and varying the regulation voltage according to said rate of change.

35. The method of claim 34, wherein the step of varying the regulation voltage comprises at least one of reducing and restoring the regulation voltage when the rate of change is above a threshold value.

36. The method of claim 35, wherein the step of varying the regulation voltage comprises reducing the regulation voltage when the algebraic sign of the rate of change is negative.

37. The method of claim 35, wherein the step of varying the regulation voltage comprises restoring the regulation voltage when the algebraic sign of the rate of change is positive.

38. A method for controlling a generator, said generator, coupled with one or more electrical loads, comprising a shaft driven at a speed, a generator output power controller capable of manipulating an output power of the generator, and a generator speed indicator capable of generating a signal indicative of the generator speed, said method comprising:
(a) measuring a rate of change in speed of the generator, via a first line; and
(b) varying the output power of the generator by applying a speed-control signal to the generator output power controller, via a second line, according to said rate of change regardless of electrical power required by the one or more electrical loads.

39. A method for controlling a generator driven by a prime mover, said generator comprising a generator output power controller capable of manipulating an output power of the generator and a generator speed indicator capable of generating a signal indicative of the generator speed, said method comprising:
(a) measuring a rate of change in speed of the generator, via a first line; and
(b) varying the output power of the generator by applying a speed-control signal to the generator output power controller, via a second line, according to said rate of change and further comprising measuring an output voltage of the generator, via a third line, and applying a voltage-control signal to the generator output power controller, via a fourth line, to maintain the output voltage substantially at a regulation voltage.

40. A method for controlling a generator driven by a prime mover, said generator comprising a generator output power controller capable of manipulating an output power of the generator and a generator speed indicator capable of generating a signal indicative of the generator speed, said method comprising:
(a) measuring a rate of change in speed of the generator, via a first line; and
(b) varying the output power of the generator by applying a speed-control signal to the generator output power controller, via a second line, according to said rate of change, wherein the speed-control signal comprises at least one of a phase modulated signal and step signal when the rate of change is above a threshold value, wherein the speed-control signal comprises a phase modulated signal when the algebraic sign of the rate of change is negative, and, wherein a duty cycle of the phase modulated signal is in proportion to the rate of change.

41. The method of claim 40, wherein said proportionality is obtained from a look up table.

42. The method of claim 40, wherein said proportionality is obtained from a functional relationship.

43. A method for controlling a generator driven by a prime mover, said generator comprising a generator output power controller capable of manipulating an output power of the generator and a generator speed indicator capable of generating a signal indicative of the generator speed, said method comprising:
(a) measuring a rate of change in speed of the generator, via a first line; and
(b) varying the output power of the generator by applying a speed-control signal to the generator output power controller, via a second line, according to said rate of change and further comprising measuring an output voltage of the generator, via a third line, and applying a voltage-control signal to the generator output power controller, via the second line, to maintain the output voltage substantially at a regulation voltage and varying the regulation voltage according to said rate of change.

44. The method of claim 43, wherein the step of varying the regulation voltage comprises at least one of reducing and restoring the regulation voltage when the rate of change is above a threshold value.

45. The method of claim 44, wherein the step of varying the regulation voltage comprises reducing the regulation voltage when the algebraic sign of the rate of change is negative.

46. The method of claim 44, wherein the step of varying the regulation voltage comprises restoring the regulation voltage when the algebraic sign of the rate of change is positive.

* * * * *